(12) United States Patent
Franzreb et al.

(10) Patent No.: US 11,185,870 B2
(45) Date of Patent: Nov. 30, 2021

(54) DEVICE AND METHOD FOR THE SELECTIVE FRACTIONATION OF ULTRAFINE PARTICLES

(71) Applicant: KARLSRUHER INSTITUT FUER TECHNOLOGIE, Karlsruhe (DE)

(72) Inventors: Matthias Franzreb, Karlsruhe (DE); Moritz Ebeler, Wolfratshausen (DE); Andre Tschoepe, Karlsruhe (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 84 days.

(21) Appl. No.: 16/499,872

(22) PCT Filed: Feb. 26, 2018

(86) PCT No.: PCT/EP2018/000075
§ 371 (c)(1),
(2) Date: Oct. 1, 2019

(87) PCT Pub. No.: WO2018/184713
PCT Pub. Date: Oct. 11, 2018

(65) Prior Publication Data
US 2020/0108401 A1 Apr. 9, 2020

(30) Foreign Application Priority Data
Apr. 3, 2017 (DE) .............. 10 2017 107 089.3

(51) Int. Cl.
*B03C 1/033* (2006.01)
*B03C 1/034* (2006.01)
(Continued)

(52) U.S. Cl.
CPC .............. *B03C 1/30* (2013.01); *B03C 1/034* (2013.01); *B03C 1/0332* (2013.01);
(Continued)

(58) Field of Classification Search
CPC ....... B03C 1/30; B03C 1/0332; B03C 1/0335; B03C 1/034; B03C 1/288; B03C 2201/18;
(Continued)

(56) References Cited

U.S. PATENT DOCUMENTS 3,676,337 A * 7/1972 Kolm .................. G01N 27/72
210/695
4,594,149 A * 6/1986 Andres .................. B03B 7/00
209/1
(Continued)

FOREIGN PATENT DOCUMENTS

WO WO 2005/113101 A2 12/2005
WO WO 2011/154178 A1 12/2011
(Continued)

OTHER PUBLICATIONS

T. Käppler: "Prozessintensivierung durch feldunterstützte Bioseparation: Elektrofiltration und in situ Magnetseparation", Universitätsverlag Karlsruhe, ISBN: 978-3-86644-305-1, pp. 51-52, (2008). An English Version of the relevant part from T. Käppler et al.: „Fractionation of proteins with two-sided electro-ultrafiltration, Journal of Biotechnology, vol. 128, pp. 895-907 (2007).
(Continued)

*Primary Examiner* — Charles A Fox
*Assistant Examiner* — Molly K Devine
(74) *Attorney, Agent, or Firm* — Norman B. Thot

(57) ABSTRACT

An apparatus for a selective fractionation of ultrafine particles includes at least three separating columns fluidically connected in series by connecting lines. An infeed is arranged to feed into a connecting line which is arranged upstream of each separating column. Each connecting line comprises an inlet for a suspension of ultrafine particles to be separated and an inlet for at least one additional mobile phase. The inlets are alternately operated. A discharge
(Continued)

branches off from a connecting line which is arranged downstream of each separating column. Each connecting line comprises an outlet for a first and a second discharge suspension of the ultrafine particles. The outlets are alternately operated. A control means provides a simultaneous switching of the through-flow switching position of the shutoff valves at the inlets and outlets. At least one magnetic field source for a magnetic field is arranged in each separating column.

18 Claims, 4 Drawing Sheets

(51) Int. Cl.
*B03C 1/28* (2006.01)
*B01D 15/18* (2006.01)
*B01D 15/38* (2006.01)
*B03C 1/30* (2006.01)
*G01N 30/44* (2006.01)
*G01N 30/52* (2006.01)

(52) U.S. Cl.
CPC ............ *B03C 1/0335* (2013.01); *B03C 1/288* (2013.01); *B03C 2201/18* (2013.01); *B03C 2201/20* (2013.01)

(58) Field of Classification Search
CPC ........................... B03C 2201/20; B01D 15/38; B01D 15/1864; B01D 15/18; B01D 35/06; G01N 30/6034; G01N 30/6039
USPC ........................... 209/39, 212, 213, 217, 224
See application file for complete search history.

(56) References Cited

U.S. PATENT DOCUMENTS

| 5,137,629 | A | * | 8/1992 | Dauchez | ............... | B03C 1/0332 |
| | | | | | | 210/222 |
| 5,356,015 | A | * | 10/1994 | Notebaart | ............... | B03C 1/025 |
| | | | | | | 209/214 |
| 2008/0135483 | A1 | | 6/2008 | Strube et al. | | |
| 2011/0163039 | A1 | | 7/2011 | Danov et al. | | |
| 2013/0087506 | A1 | | 4/2013 | Danov et al. | | |
| 2014/0083948 | A1 | | 3/2014 | Yang | | |
| 2019/0134534 | A1 | | 5/2019 | Anton | | |

FOREIGN PATENT DOCUMENTS

| WO | WO 2012/122627 A1 | 9/2012 |
| WO | WO 2017/199031 A1 | 11/2017 |

OTHER PUBLICATIONS

A. Seidel-Morgenstern et al.: "New Developments in Simulated Moving Bed Chromatography", Chem. Eng. Technol., vol. 31, No. 6, pp. 826-837, (2008).

* cited by examiner

DEVICE AND METHOD FOR THE SELECTIVE FRACTIONATION OF ULTRAFINE PARTICLES

CROSS REFERENCE TO PRIOR APPLICATIONS

This application is a U.S. National Phase application under 35 U.S.C. § 371 of International Application No. PCT/EP2018/000075, filed on Feb. 26, 2018 and which claims benefit to German Patent Application No. 10 2017 107 089.3, filed on Apr. 3, 2017. The International Application was published in German on Oct. 11, 2018 as WO 2018/184713 A1 under PCT Article 21(2).

FIELD

The present invention relates to an apparatus and to a method for selective, and, for example, at the same time continuous fractionation of ultrafine particles.

BACKGROUND

The selective fractionation of ultrafine particles on an industrial scale is a major challenge which has to date only been partially solved. Particularly in the field of continuous fractionation processes, there are currently no methods capable of fractionating particles smaller than 1 µm multi-dimensionally and with narrow separation limits. Interestingly, this limitation no longer applies at lower orders of magnitude, at the molecular level.

Various methods exist for truly dissolved ions and molecules which are able to achieve efficient fractionation on an industrial scale.

Among the most effective methods for dissolved molecules is liquid chromatography which achieves very good separation results for almost all substance classes due to the large number of separation stages it can perform and the variety of interaction mechanisms available (e.g., ion exchange, hydrophobic interaction, size exclusion, etc.). These methods are also in principle suitable for development as continuous processes.

One example of a continuous chromatography method is the "Simulated Moving Bed" (SMB) process as described in Seidel-Morgensteren A et al., New Developments in Simulated Moving Bed Chromatography, Chem. Eng. Technol. 2008, 31 No. 6, pages 826-837, in which a counter-current movement of one stationary and one mobile phase is represented by splitting the stationary phase over a plurality of separating columns (for example, at least four) and the real movement of these columns is represented by a carousel structure and the simulated movement by cyclic valve circuits. By precise coordination of the flow rates and switching times of the column change, it is possible to achieve continuous separation of the substances in the infeed into an "extract" and a "raffinate discharge" by application of the counter-current principle, wherein, depending on the design, an almost complete separation of a two-component mixture is achieved.

In the case of mixtures with more than two product classes, more complex interconnections with numerous separating columns are known, which in this case also lead to a complete separation of the components. Corresponding SMB processes for separating aromatics are realized, for example, by Honeywell-UOP, with throughputs of up to 150 m³/h.

The use of SMB processes has to date been limited to solutes, as the interactions between the substances and the stationary phase take place directly on the solid surface and are, for example, electrostatic or hydrophobic in nature. A partial exception to this is the use of size exclusion chromatography, i.e., obtaining a different retention time within the sub-columns based on the dependence of pore accessibility on the molecule or particle size. Because of the diffusion-dependent separation mechanism in porous stationary phases, however, the size exclusion chromatography process is very slow and is associated with dilution of the substance concentration or particle concentration of the starting sample.

SUMMARY

An aspect of the present invention is to provide an apparatus and a method which enables the selective fractionation of ultrafine particles and which mitigates the above limitations.

In an embodiment, the present invention provides an apparatus for a selective fractionation of ultrafine particles which includes at least three separating columns fluidically connected in series by connecting lines. The at least three separating columns are each configured to be through-flowable in a predetermined through-flow direction and each comprise a packing. At least one infeed is arranged to feed into a connecting line which is arranged upstream of each of the at least three separating columns. Each connecting line comprises an inlet for a suspension of ultrafine particles to be separated and an inlet for at least one additional mobile phase. The inlets are configured to be alternately operated. At least one discharge branches off from a connecting line which is arranged downstream of each of the at least three separating columns. Each connecting line comprises an outlet for a first discharge suspension of the ultrafine particles and an outlet for a second discharge suspension of the ultrafine particles. The outlets are configured to be alternately operated. The ultrafine particles of the first discharge suspension interact more strongly with the packing of each of the at least three separating columns than the ultrafine particles of the second discharge suspension. A shutoff valve, which can be positioned to have a blocking switching position and a through-flow switching position, is arranged at each of the inlets and at each of the outlets. A control means is provided for a simultaneous switching of the through-flow switching position of the shutoff valves at the inlets and at the outlets. At least one inlet and at least one outlet is respectively switchable to the through-flow switching position for the suspension of ultrafine particles to be separated, for the least at least one additional mobile phase, for the first discharge suspension of ultrafine particles, and for the second discharge suspension of ultrafine particles. At least one of the at least three separating columns is arranged between the outlet switched to the through-flow switching position for the second discharge suspension of ultrafine particles and the inlet upstream therefrom switched to the through-flow switching position for the suspension of ultrafine particles to be separated. At least one of the at least three separating columns is arranged between the outlet switched to the through-flow switching position for the first discharge suspension of ultrafine particles and the inlet downstream therefrom switched to the through-flow switching position for the suspension of ultrafine particles to be separated. At least one of the at least three separating columns is arranged between the outlet switched to the through-flow switching position for the first discharge suspension of ultrafine particles and the inlet upstream therefrom which is switched to the through-flow switching position for the at least one additional mobile phase. At least one magnetic field source for a magnetic field is arranged in each of the at least three separating columns.

BRIEF DESCRIPTION OF THE DRAWINGS

The present invention is described in greater detail below on the basis of embodiments and of the drawings in which.

DETAILED DESCRIPTION

Figure 1:
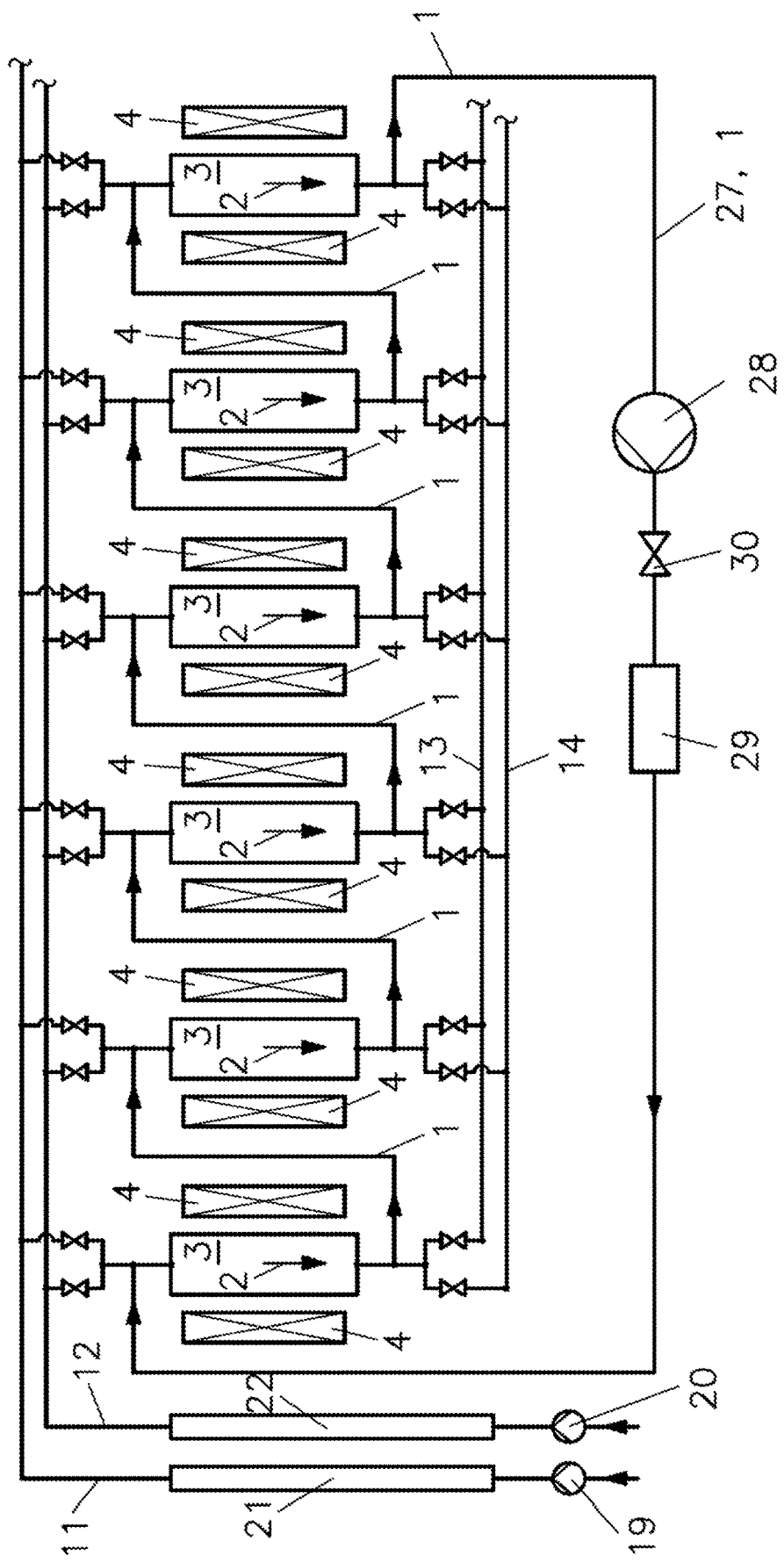
FIG. 1 shows a schematic view of the apparatus of an exemplary embodiment.

The present invention provides an apparatus for the selective fractionation of ultrafine particles, which includes at least three, for example, at least four, separating columns fluidically connected in series by connecting lines and fluidically through-flowable in a predetermined through-flow direction. The separating columns connected in series via the fluidically connecting lines can, for example, be connected in a ring to form a fluid circuit.

The columns can, for example, be arranged vertically with each column having a port at the top and at the bottom for the connecting line. The connecting lines can, for example, each connect a top and a bottom port of adjacent separating columns. The aforementioned through-flow direction can, for example, run from top to bottom through the separating columns. All of these separating columns can, for example, be identical, particularly in respect of their geometric dimensions, in particular the though-flowable interior volumes, the configuration and the orientation to the vertical. All of these connecting lines between the separating columns can, for example, also be identical, particularly in respect of their geometric dimensions, in particular their through-flowable interior volumes, the configuration and the orientation to the vertical.

The basic construction of the apparatus with separating columns connected fluidically in series via connecting lines thus resembles a structure for performing a continuous chromatography process, e.g., the abovementioned Simulated Moving Bed (SMB) process.

An essential feature of the present invention comprises the at least one magnetic field source for generating a magnetic field in each separating column. Magnetic field sources are created within the scope of the present invention by permanent magnets or electromagnets, each having at least one electromagnetic coil. It is essential that at least one (for example, at least the downstream and/or upstream separating columns for introducing the suspension of ultrafine particles), for example, each separating column, can be charged with a magnetic field either individually or together with others, for example, either each separately by a separate magnetic field source for each separating column or alternatively by one or more common magnetic field sources for two or more separating columns. In an embodiment, the field strength can be adjusted individually in each separating column. An additional degree of freedom for setting a tunable process control is thereby provided. The magnetic field sources and thus the maximum adjustable magnetic field strength can, for example, be the same in each column, i.e., identical in strength, distribution and orientation, or they can be varied simultaneously for all separating columns. Variable magnetic field sources can, for example, be directly actuable electromagnets and/or permanent magnets which can be repositioned relative to the separating column, for example, via motorized positioning. An optional variant provides a variable magnetic field source, which enables magnetic field strengths with a cyclical progression, e.g., a sinusoidal alternating field. Variable magnetic field sources allow an ideal selection of the magnetic field strength in each separating column, so that an additional degree of freedom in process control is realized compared with the known SMB process. The close relationship between the column behavior and the through-flow rate which exists in the known SMB process is thereby removed.

Similarly to an SMB of the type as mentioned above, the apparatus further comprises:

at least one infeed into the connecting line located in front of each separating column, each having at least two alternately operated inlets for a suspension of ultrafine particles to be separated, and at least one additional mobile phase; and at least one discharge branching off from the connecting line after each separating column, each having at least two alternately operable outlets for one suspension of ultrafine particles each, wherein the ultrafine particles of the first discharge suspension interact more strongly with the packing of the separating column than the ultrafine particles of a second discharge suspension.

An embodiment provides the aforementioned infeeds and discharges in each case as a single channel opening into or out of the respective connecting line. One infeed and one discharge in each case can, for example, be provided for each of the connecting lines.

The aforementioned two inlets for a suspension of ultrafine particles to be separated and at least one additional mobile phase open into the channel of the infeed. Fluidic, for example, manifold pipes can, for example, be provided for the suspension of ultrafine particles and the mobile phase from which fluid channels open out to the inlets.

The aforementioned outlets for one suspension of ultrafine particles in, for example, different proportions in each case branch off from the channel of the discharge, wherein the ultrafine particles of the first discharge suspension interact more strongly with the packing of the separating column than the ultrafine particles of a second discharge suspension. Each of these suspensions can, for example, be transported out of the discharges via the outlets into a fluid collector pipe in each case.

The ultrafine particles have a preferred particle size between 1 nm, for example, 10 nm and 20 µm, for example, 5 µm. They are thus colloidal ultrafine particles and extend over at least substantial orders of magnitude of nanoparticles having particle sizes between 1 nm and 1000 nm.

The suspension of ultrafine particles to be separated can, for example, comprise ferro-, ferri- or paramagnetic ultrafine particles and a solution that is more weakly paramagnetic or diamagnetic than the ultrafine particles as the liquid. An alternative, optional variation of the suspension of ultrafine particles to be separated provides ultrafine particles in a fluid which is more strongly paramagnetic, ferromagnetic or ferrimagnetic than the ultrafine particles, i.e., exactly the opposite situation. The fluid in this case comprises or is a paramagnetic solution or a ferrofluid. Both variants of the suspension of ultrafine particles thus provide a different magnetic force to be exerted on the particles and the solution; a basic requirement for magnetic separability of these suspension components.

The scope of the present invention also includes providing the infeeds and/or discharges optionally in each case as a plurality of inlet and outlet channels to the respective connecting line. It is also within the scope of the present invention to combine the infeeds and/or discharges with the inlets and outlets in one point or to have the infeeds and/or discharges open directly into the connecting line, i.e., the infeeds and/or discharges form the inlets and outlets. In both of these embodiments, an inlet or outlet does not necessarily open into the respective connecting line at one point, but it may rather be distributed over a larger area in the connecting line in a manner which is particularly advantageous for intervention.

Shutoff valves with two switching positions each, a shutoff switching position (no through-flow) and a through-flow switching position (through-flow) are provided at each inlet and outlet. Each shutoff valve is switchable either only in the shutoff switching position or through-flow switching position, wherein the through-flow can, for example, be regulated. This is provided, for example, via a controllable throttling function in the through-flow in the through-flow switching position or by an active conveying means, e.g., a pump, interposed before or after the respective shutoff valve, or alternatively by a controllable separate throttle arrangement. In order to actuate the shutoff valves, a control means is provided, for example, a process computer-controlled process control system which controls not only the shutoff valves but also other adjustable elements of the apparatus, for example, the magnetic field sources.

The openings of the aforementioned infeeds or inlets can, for example, be located in the respective connecting lines between in each case two separating columns in the through-flow direction downstream of the openings of the aforementioned discharges or outlets from the respective connecting lines. All openings and all connecting lines between the separating columns, for example, also the infeeds, discharges and the inlets and outlets having the respective shutoff valves can, for example, be identical, in particular identical in respect of their geometric dimensions, particularly the through-flowable internal volumes and the configuration and the flow guidance.

The aforementioned control means can, for example, be provided for simultaneous switching of the through-flow switching positions of the shutoff valves for the inlets and the outlets, wherein in each case, at least one inlet or at least one outlet for the suspension of ultrafine particles to be separated is always switchable to the through-flow switching position for the at least one additional mobile phase and the at least two discharge suspensions of ultrafine particles. The control means may additionally or alternatively be accessed for actuating, setting and varying the magnetic field strengths of the magnetic fields in the separating columns, realizable e.g., by actuating electromagnets that generate the magnetic fields, or for example motor-adjustable permanent magnets, for example, at the separating columns.

The switching of the shutoff valves between the through-flow switching position and the shutoff switching position of the inlets and outlets can, for example, take place synchronously, wherein:

at least one separating column is arranged between the outlet switched to the through-flow switching position for the second suspension (second discharge suspension) of ultrafine particles and the inlet upstream therefrom switched to the through-flow switching position for the suspension of ultrafine particles to be separated;

at least one separating column is arranged between the outlet switched to the through-flow switching position for the first suspension (first discharge suspension) of ultrafine particles and the inlet downstream therefrom switched to the through-flow switching position for a suspension of ultrafine particles to be separated; and at least one separating column is arranged between the outlet switched to the through-flow switching position for the first discharge suspension of ultrafine particles and the inlet upstream therefrom switched to the through-flow switching position for an additional mobile phase.

A manifold pipe for an aforementioned suspension of ultrafine particles to be separated and at least one aforementioned additional mobile phase can, for example, be provided in each case, from which the aforementioned inlets open out. Similarly, a collector pipe for the aforementioned one suspension of ultrafine particles can, for example, be provided in each case, wherein the ultrafine particles of the first discharge suspension interact more strongly with the packing of the separating column than the ultrafine particles of a second discharge suspension. The respective aforementioned outlets can, for example, open entirely into the collector pipes.

An embodiment of the separating columns can, for example, provide for filling each of these with a through-flowable matrix. The through-flow capability can, for example, extend over the entire volume of the matrix, and, for example, in each through-flow direction, whereby the access of the fluids to the separating columns, in particular that of the fluid with the ultrafine particle charge to be separated, is provided over the entire matrix. The matrix can, for example, occupy the entire volume of the separating column.

The through-flowable matrix can, for example, be formed by a fixed bed of packing elements, wires or a wire mesh. The matrices in each separating column and/or the separating columns can, for example, be identical. The magnetic field in the separating column may be influenced fundamentally by this matrix. In particular, the regions of increased magnetic field gradients are considerably enlarged in a particularly advantageous manner by the through-flowable matrix, which in turn significantly improves the efficiency of the selective fractionation, increases the achievable throughputs, and represents a significant advance towards an industrial application of the apparatus and the method operated thereby.

The flow-exposed surface regions of the matrix, particularly of the packing elements, of the through-flowable fixed bed or wires or packed bed bulk of the wire mesh in the separating columns can, for example, be non-porous, which advantageously has the effect of eliminating or at least reducing a deposit on and/or contamination of the matrix, particularly of the packing elements or wires or of the wire mesh by all the fluid components, particularly the suspension of ultrafine particles.

The through-flowable matrix in the separating columns can, for example, further comprise a magnetizable material or can, for example, consist of a magnetizable material, which advantageously enables a selective concentration of magnetizable fluid components, particularly from the suspension of ultrafine particles in the near-surface layers of liquid. The effect of the magnetic field sources on the volume of the matrix is thus increased significantly. The matrix can, for example, have a saturation magnetization greater than or equal to 1 A·m²/kg, for example, more closely restricted between 0.7 or 0.9 and 20 or 80 A·m²/kg.

An optional embodiment of the through-flowable matrix provides for the integration of wires or a wire mesh made of soft magnetic steel as the bed in the, for example, cylindrical internal volumes of the separating columns. The wires in this context can, for example, have a volume ratio of 1 or 2 to 10 or 20% and diameters of, for example, about 50 to 200 µm. They consequently generate high field gradients and at the same time a substantially increased surface area, an increased concentration of magnetic particles is expected in the adjacent liquid region thereof when a method is performed with the apparatus. In this embodiment, however, a relatively disordered wire arrangement is present in the matrix, which in turn leads to unpredictable magnetic field inhomogeneities and gives rise to the risk of undesirable particle deposits in the region of the adsorption surfaces. There is therefore an upper limit to the aforementioned volume fraction with this embodiment which in turn again counteracts a desired reduction of the transport paths.

An optional embodiment provides for creating the through-flowable matrix with a bed of packing elements. The packing elements can, for example, be made of monodisperse magnetizable spheres, for example, with diameters between 5 and 10 and 20 or 50 µm. The diameters of the spheres are ideally in the range between 10 and 50 times the maximum particle diameter of the ultrafine particle masses in the fluid to be separated. Sphere beds reduce the aforementioned adverse inhomogeneities of the matrix arrangement compared to wire arrangements and based on experience enable an almost ideal piston flow (i.e., all liquid volume elements have almost the same residence time in the column) in separating columns, thus resulting in good separation in the continuous fractionation of ultrafine particles. A matrix can, for example, consist of a bed of spheres of the same kind, in particular of the same size, which as a bed with a filling degree of 60 to 70% leaves only little free volume for a permanent particle separation. However, unlike high gradient magnetic separation, this is an advantage in this case because no permanent particle separation is desired, but only a retardation during the through-flow, and the entire fluid volume is in close contact with the matrix surface during the through-flow.

An optional embodiment provides a permanent magnetic matrix, for example, of packing elements, which at the same time may also serve as magnetic field sources. Depending on the configuration of the apparatus and of the method that is conducted therewith, external magnetic field sources are replaceable for selective fractionation of ultrafine particles. With the absence of the external magnetic field sources, the required installation space of the apparatus can also be reduced.

The present invention further comprises a method for selective fractionation of ultrafine particles with an aforementioned apparatus, for example, comprising the following method steps:

Providing an apparatus as identified and described previously, a liquid mobile phase, and the ultrafine particle suspension to be separated.

Passing the liquid mobile phase serially through the separating columns in the through-flow direction, i.e., for example, from top to bottom through upright separating columns.

Activating the magnetic fields in at least one of the separating columns.

Introducing the suspension of ultrafine particles that is to be separated into the connecting line between two separating columns via the inlet. The suspension of ultrafine particles can, for example, be introduced into the inlets via a manifold pipe and only forwarded to the respective inlet and/or to the respective connecting line via the feed lines in which and while the shutoff valve is set to the through-flow switching position.

Simultaneous cyclic switching of the through-flow switching positions of the shutoff valves at the inlets and the outlets, wherein always only one inlet in each case for the suspension of ultrafine particles and the mobile phase and one outlet in each case for the at least two fractionated discharge suspensions of ultrafine particles, wherein the ultrafine particles of the first discharge suspension interact more strongly with the packing of the separating column than the ultrafine particles of a second discharge suspension, is simultaneously switchable to the through-flow switching position, at least one separating column is arranged between the outlet switched to the through-flow switching position for the second discharge suspension of ultrafine particles and the inlet upstream therefrom switched to the through-flow switching position for the suspension of ultrafine particles to be separated, at least one separating column is arranged between the outlet switched to the through-flow switching position for the first discharge suspension of ultrafine particles and the inlet downstream therefrom switched to the through-flow switching position for the suspension of ultrafine particles to be separated, and at least one separating column is arranged between the outlet switched to the through-flow switching position for the first discharge suspension of ultrafine particles and the inlet upstream therefrom switched to the through-flow switching position for the mobile phase.

In an embodiment, the magnetic fields can, for example, be actuable and variable in respect of their magnetic field strengths by the control means.

A further embodiment provides that the suspension of ultrafine particles to be separated comprises dia- or paramagnetic ultrafine particles and a fluid that is more strongly paramagnetic or ferro- or ferrimagnetic than the ultrafine particles as a liquid. In this case, ultrafine particles with the larger amount of susceptibility difference between ultrafine particles and fluid are displaced more readily from the area of the matrix surface and thus are transported more rapidly by the through-flowing mobile phase. The ultrafine particles with the larger amount of susceptibility difference thus form the second discharge suspension; the ultrafine particles having the smaller amount of susceptibility difference form the first discharge suspension.

The suggested solutions described in the introduction are based initially on the idea of combining the advantages of continuous countercurrent chromatography with separating characteristics that allow manipulation of suspended ultrafine particles. Magnetic forces are in particular used as remote-acting physical interactions between, for example, a particulate stationary phase and colloidal ultrafine particles. For this reason, magnetic forces are used in the proposed solution as a controllable, energy-efficient and extensive interaction between ultrafine particles and a magnetizable stationary phase.

The starting point is the process of concentration of magnetic nanoparticles in the fluid areas in which an increased magnetic field strength is present. It should here be noted that the movement of a particle into an area of higher field strength is also associated with the displacement of a corresponding volume of fluid out of this area to the original particle position. The ultimate driving force $F_m$ for directed particle movement may thus be expressed as:

$$F_m = \tfrac{1}{2} \cdot \mu_0 \cdot \Delta\kappa \cdot V_p \cdot \nabla(H^2) \quad (1)$$

where $\Delta\kappa = \kappa_p - \kappa_f$, i.e., the susceptibility difference $\Delta\kappa$ between the particle and the surrounding fluid (H=magnetic field strength; to $\mu_0$=magnetic field constant, $V_p$=particle volume). Depending on the susceptibility difference, it is important for the further description that for diamagnetic or only weakly paramagnetic particles and also strongly paramagnetic fluids, nanoparticles may also be displaced by this from the region of higher field strength.

The concentration effect is utilized by applying an inhomogeneous magnetic field in the separating columns. As can be seen from equation (1), besides the absolute field strength H, particularly the gradient of the field strength, i.e., the extent of spatial change, is also decisive for the magnetic force. The requirement for gradients>100 T/m reveals the need for small magnetic structures and channel structures, i.e., small transport paths for the ultrafine particles that are to be concentrated and displaced. The distances over which the particles in the initial suspension must migrate (fluid to be separated with ultrafine particle masses) in the separating columns must moreover be kept short in order to reduce the time for adjusting the concentration enrichment.

In order to realize short transport paths for the particle masses in the separating columns and at the same time large separating column volumes for correspondingly large achievable throughput, use of the magnetizable, through-flowable matrix described above is proposed to create high local field gradients in the region of an outer, largely homogeneous magnetic field.

To avoid a permanent separation of particle masses on the matrix surfaces due to excessive magnetic forces, the external magnetic field is set so that a local particle concentration exists in the fluid region close to the matrix, but the limit for forming compact deposits is not exceeded. The limitation of particle concentration is assured by the ever-present principle of Brownian molecular movement, which causes a diffusion of the particles from the high-concentration region to the low-concentration regions. In sum, a dynamic equilibrium is reached in which the probability of residence for more strongly magnetic ultrafine particles is increased in the vicinity of the magnetized matrix. Since the flow rate in the region of the laminar boundary layer about the matrix is also reduced, this results in a slower transport of magnetic ultrafine particles through the column, i.e., a retardation.

The present invention will be explained in greater detail below under reference to embodiments, the figures and description thereof. The features illustrated and their combinations are not only limited to these embodiments and their embodiments. They can rather be combined as representative of other embodiments which are also possible, but not explicitly characterized as embodiments.

Figure 2:
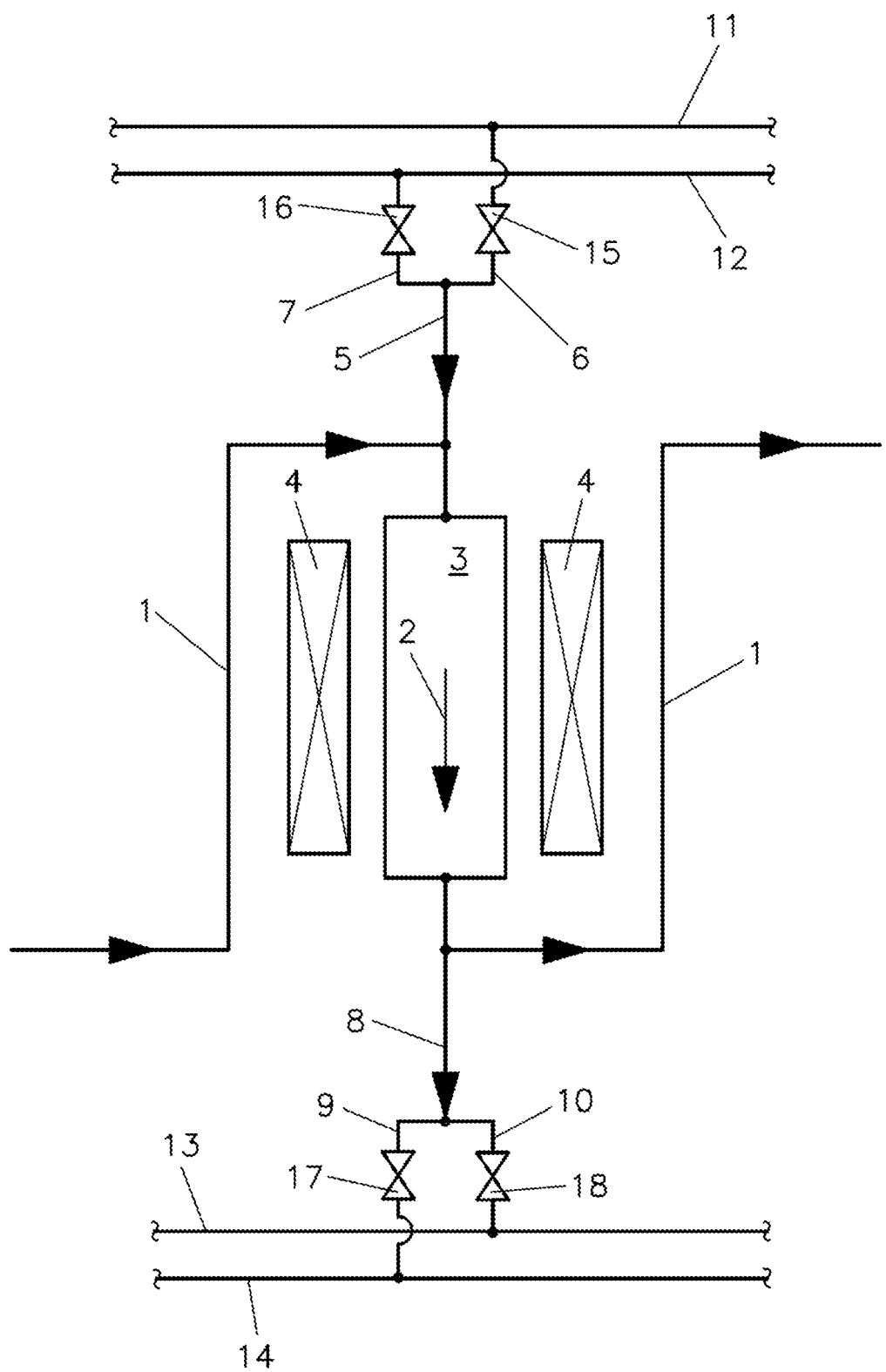
FIG. 2 shows an enlarged detail of the view according to FIG. 1 in the region of one of the separating columns.

An apparatus in the embodiment illustrated in FIG. 1 includes at least three separating columns 3 fluidically connected in series by connecting lines 1 and through-flowable in a predetermined through-flow direction 2. At least one magnetic field source 4 is provided for each magnetic field in each separating column 3. The magnetic field sources 4 shown in the embodiment are electromagnetic solenoids, alternatively Helmholtz coils, which are each arranged concentrically around one of the, for example, cylindrical separating columns 3. FIG. 2 shows an enlarged detail of FIG. 1 in the region of one of the separating columns 3.

Before each separating column 3 in the through-flow direction, one infeed 5 also opens into each connecting line 1 each having at least two alternatively operated inlets for a suspension of ultrafine particles 6 to be separated and for at least one additional mobile phase 7. All inlets 6 and 7 are in turn each connected to a manifold pipe for the suspension of ultrafine particles 11 to be separated and for the additional mobile phase 12 as a central feed line for said fluids in each case. Each manifold pipe is connected to a delivery pump 19 and 20 and equipped with an optional pre-filter 21 and 22.

After each separating column 3 in the through-flow direction, and before the infeed 5 of the following separating column 3, one discharge 8 in each case with at least two alternatively operable outlets 9 and 10 for one discharge suspension of ultrafine particles each, wherein the ultrafine particles of the first discharge suspension diverted through outlet 9 interact more strongly with the packing of the separating column than the ultrafine particles of a second discharge suspension diverted through outlet 10, branches off from the connecting line. All outlets 9 and 10 are in turn each connected to a collector pipe for first discharge suspension 13 and the second discharge suspension 14 as central discharge for said suspensions.

As described previously, shutoff valves 15, 16, 17 and 18 are provided in each inlet 6 and 7 and each outlet 9 and 10, each having two switching positions, a blocking switching position and a through-flow switching position. Optionally, the shutoff valves as described above have a throttle function. Alternatively or additionally, active conveying means, for example a pump, are provided, connected optionally before or after the respective shutoff valve, alternatively by a regulatable separate throttle arrangement (not shown in further detail in FIGS. 1 to 3). Also not shown in further detail are control means for simultaneous switching of the through-flow switching positions of the shutoff valves of the inlets and of the outlets.

The control means are adjusted so that in each case at least one inlet and at least one outlet for the suspension of ultrafine particles 6 to be separated, for the at least one additional mobile phase 7, and the at least two discharge suspensions of ultrafine particles 9 and 10 are always switchable to the through-flow switching position. Optionally, the magnetic fields are also controllable by the control means via the electromagnetic magnetic field sources 4.

Figure 3:
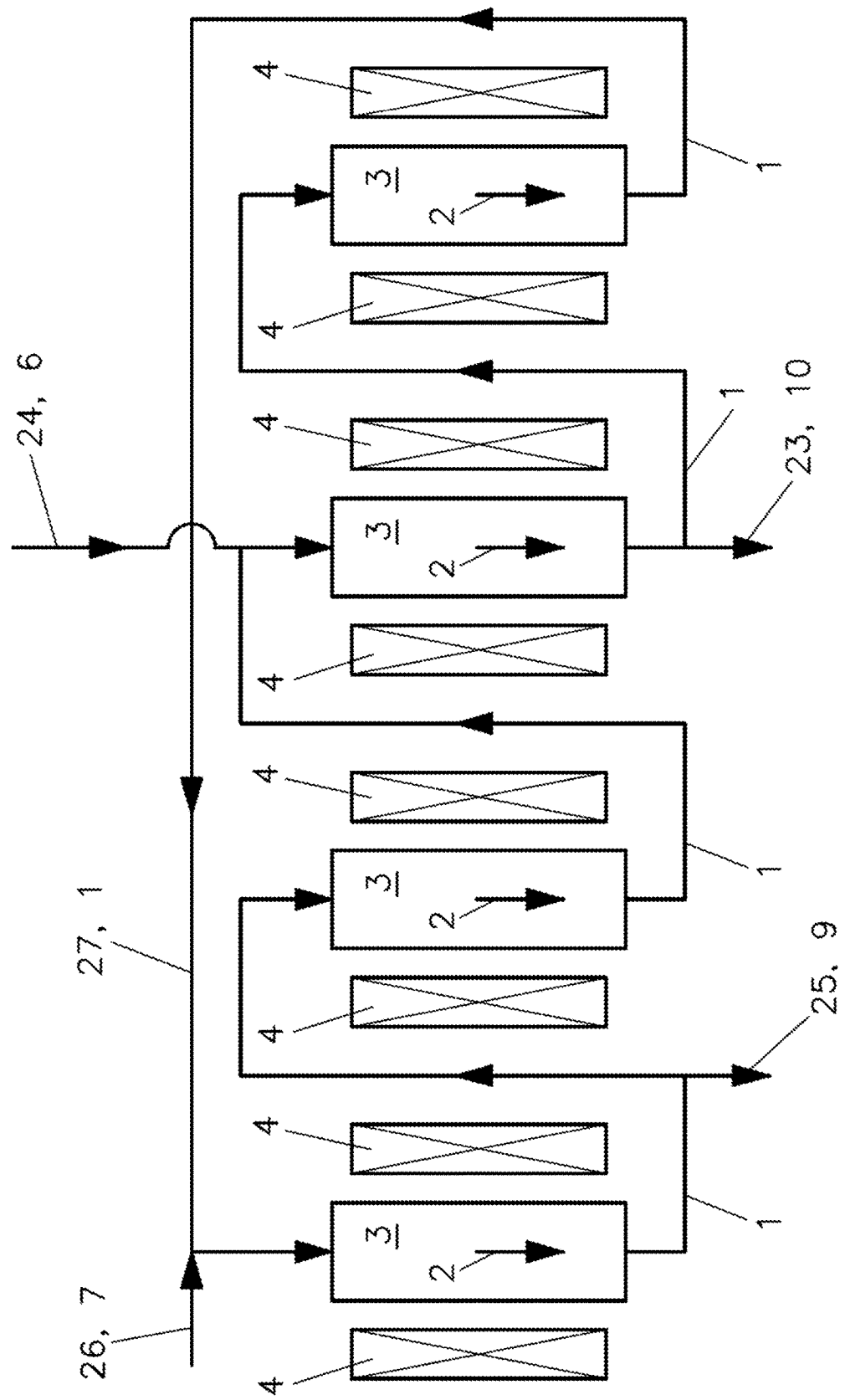
FIG. 3 shows a simplified representation of view represented in FIG. 1 of the apparatus in the operating state.

FIG. 3 indicates the operating status of the apparatus, which is presented in a highly simplified manner compared with FIG. 1. The pipes on which the shutoff valves are set to blocking switching positions are not shown in FIG. 3. Essential for the performance of the method for selective fractionation of ultrafine particles using the apparatus according to FIGS. 1 and 2 is that at least one of the separating columns 3 is arranged between the outlet switched to the through-flow switching position for the second discharge suspension 23 of ultrafine particles and the inlet upstream therefrom switched to the through-flow switching position for the suspension of ultrafine particles 24 to be separated. Moreover, at least one separating column 3 is also located between the outlet switched to the through-flow switching position for the first discharge suspension 25 of ultrafine particles and the inlet downstream therefrom switched to the through-flow switching position for a suspension of ultrafine particles 24 to be separated. Further, at least one separating column 3 is also arranged between the outlet switched to the through-flow switching position for the first discharge suspension 25 of ultrafine particles and the inlet upstream therefrom for an additional mobile phase 26.

There is also at least, for example, an additional connecting line 27, for example, (as represented in FIG. 1) with an optional dedicated delivery pump 28 and a police filter 29 and a shutoff valve 30 (for example, represented by the last separating column 3 in the through-flow direction back to the first), with which the apparatus with the at least three separating columns 3 fluidically connected in series by connecting lines 1 can be interconnected as a ring to form a circuit.

The use of at least three, for example, four or six (see FIG. 1 or 3) to eight separating columns 3 and a valve circuit (aforementioned shutoff valves and control means) for implementing a simulated countercurrent principle (time-clocked switching of the switched-through inlets and outlets counter to the through-flow direction similar to a Simulated Moving Bed, SMB) between the separating column arrangement and the through-flowing suspension mixture enables a continuous implementation of the method and therewith a substantial increase in throughput compared to cyclically operating processes (batch processes). A volumetric flow setting of the counterflowing volume flows of the mobile and of the stationary phase also enables focusing and thus concentration of the target product in the region of the switched-through discharge for the first and second discharge suspension 23 or 25.

The combination of the separation principle of magnetic chromatography with densely packed matrices of magnetizable spheres and operation similar to an SMB apparatus according to the prior art has the potential for efficient fractionation of magnetic ultrafine particles on an industrial scale.

The present invention will be explained for exemplary purposes in further detail with reference to further application examples applications and uses:

Application Example 1: Work-Up of Polishing Suspensions

Polishing suspensions used e.g., for industrial surface finishing in the semiconductor industry represent by way of example an ultrafine particle system which must undergo an elaborate fractionation and thus purification. The suspensions consist of a carrier liquid in which abrasive particles (ultrafine particles) are suspended. They may, to achieve the necessary surface quality, for example, in the semiconductor industry, have no particles larger than a predetermined particle size, for example, 50 nm, since the required wafer-surface quality cannot otherwise be obtained. All of the abrasive particles in the suspension in principal generate grooves in the surface to be machined which correspond in their order of magnitude to the particle size. The particle size in the suspension in the application example can, for example, be between 5 and 50 nm, wherein smaller abrasive particles below 5 nm, for example, between 1 and 5 nm in principle do not present a problem in terms of polishing suspensions. Individual oversize particles, however, e.g., in the example a particle having a particle size over 50 nm, however, generate unacceptably large grooves, whereby the technical functional structure of the semiconductor surfaces is increasingly destroyed with increasing size, and functionality is impaired or rendered impossible.

The goal of the process with the apparatus of the present invention is to selectively remove the oversize particles from the polishing suspension. For this purpose, it must be provided that the selectively detected abrasive particles have ferro-, ferri- or paramagnetic properties that exceed those of the carrier liquid. The ferro-, ferri- or paramagnetic properties of the oversize particles and their behavior in the separating columns are dependent on the particle size and thus also on the amount of material with the above properties, a prerequisite for the selective separation of ultrafine particles above a determinable size. If abrasive particles themselves do not have these properties (for example, corundum particles etc.), they should be functionalized, for example, with a particle coating having ferro-, ferri-, or paramagnetic properties.

Application Example 2: Processing of Nanopowder and Nanoaerosols

Nanoparticles with a property profile predetermined by the further processing, for example, of the grain sizes within narrow limits (monodispersivity) and/or the material purity and/or the rheological properties in a suspension, serve as an intermediate or starting product in nanotechnology. The production of nanoscale metallic short fibers i.e., with fiber lengths of between 1 nm and 1000 nm, which are used, for example, in the manufacture of solar cells, likewise require a metallic nanoaerosol as growth nuclei. Monodispersivity of the particles is here a prerequisite.

The goal of the process with the apparatus of the present invention is here to isolate nanoparticles with the property profile predetermined by the further processing from a starting suspension (fluid to be separated with ultrafine particle masses). If the nanoparticles have ferro-, ferri- or paramagnetic properties, particles above a predeterminable size or magnetic property are, for example, initially removed in a first method as in the above application example and discharged with one of the two suspensions via the discharges and at least one of the outlets from the apparatus for one of two suspensions to be discharged from the apparatus. The other suspension to be discharged via the discharges and at least one of the outlets of the device for the respective other comprises not only the nanoparticles to be isolated but also other nanoparticles which are to be separated during the course of a subsequent second similar method for selective fractionation of ultrafine particles.

By means of multiple serial implementation of the method of the present invention, it is advantageously possible, in each method, for a portion of the nanoparticles originally bound in the suspension to be iteratively and selectively removed. This serial iterative process is expedient not only in the described application but basically also in applications, in particular in the case of which particles with a different property profile, which differs physically and/or chemically, are to be selectively separated from a fluid to be separated with ultrafine particle masses.

Also advantageous in the case of multiple serial implementation of the method of the present invention is the possibility of the use of different carrier fluids at every iteration step. The carrier fluid and the particles form, as a suspension, a system which can be newly formulated depending on the task to be performed. Since the particles of the fluid to be separated with the ultrafine particle masses (starting suspension) are initially predefined, influencing is realized only through the selection of the liquid of the starting suspension. Here, and also in other applications, there are basically two configurations:

Method, characterized in that the suspension of ultrafine particles to be separated comprises dia- or paramagnetic ultrafine particles and comprises, as liquid, a solution which is more strongly paramagnetic than the ultrafine particles, or a ferrofluid, or Method, characterized in that the suspension of ultrafine particles to be separated comprises ferromagnetic, ferrimagnetic or paramagnetic ultrafine particles and comprises, as fluid, a solution which is more weakly paramagnetic or diamagnetic than the ultrafine particles.

Application Example 3: Fractionation of Dia- and Paramagnetic Ultrafine Particles Magnetic ultrafine particles with a narrow size distribution are, for example, an important constituent part of innovative medical products such as contrast agents or as carrier particles for so-called hyperthermia or drug targeting.

Magnetic ferrite particles with a narrow size distribution are also of relevance as a feature for forgery-proof printing inks or as a constituent part of high-frequency antennae. Despite this industrial relevance of magnetic ultrafine particles, by far the greatest share of technical ultrafine particles have only dia- or paramagnetic characteristics, i.e., the possibility of direct influencing via weak to moderate magnetic fields is low. As will be discussed below, the present invention, in a modified form, also offers potential for the fractionation of these particles.

Crucial for the behavior of ultrafine particles in regions with strongly inhomogeneous magnetic fields is the difference in the susceptibilities of the particle and of the surrounding fluid. In the case of low or, in the case of diamagnetic materials, even slightly negative particle susceptibilities, it is nevertheless possible, through the selection of fluids with relatively high susceptibility, to achieve adequate susceptibility differences. The particles are here, however, not concentrated in the fluid region in the vicinity of the matrix surface, but are rather forced out of this region by the fluid with relatively high susceptibility. Consequently, the available void volume, that is to say the space that is not occupied by the matrix, for diamagnetic ultrafine particles is reduced, resulting in a retention time that is reduced in relation to the fluid. Initially highly concentrated solutions of strongly paramagnetic ions (such as, for example, $Mn^{2+}$) are expedient as fluids of relatively high susceptibility. Much higher separating forces can, however, be predicted if stable suspensions of magnetic nanoparticles or magnetic fluids are used. For economical operation, the recovery of the fluid from the suspension discharge is certainly necessary in all cases. In the case of real solutions, this can be achieved via classic solid-liquid separation with filtration methods, for example, and in the case of magnetic nanoparticles, high-gradient magnetic separation with a fine matrix and relatively strong background fields is expedient. Otherwise, through the use of fluids of high susceptibility for dia- and paramagnetic ultrafine particles also, fractionation by magnetic countercurrent chromatography is possible with the described SMB operating method.

Application Example 4: Fractionation of Magnetic Nanoparticles

The retention times of magnetic nanoparticles were tested within a separating column filled with a magnetizable particle bed and superimposed magnetic field. Permanent magnets and electromagnets (cylinder coil or Helmholtz coil) were used as magnetic field sources, wherein, in the case of the electromagnet, frequency-modulated and amplitude-modulated alternating fields were used.

The separation matrix used in the separating column was composed of steel spheres with an average diameter of 18 µm. With a self-made Helmholtz coil, in the case of magnetic flux densities of only 10 mT, a great increase in the retention times of magnetic ultrafine particles in the range from 50 nm to 400 nm was achieved in relation to the retention times of simultaneously introduced tracer ions. Furthermore, the fractions obtained in the discharge exhibit clear dependency of the size of the contained particles on the retention time. Owing to the broad particle size distribution in the introduced sample and the inadequate separation efficiency of the test setup of the preliminary tests, complete fractionation was not achieved. The tests show, however, the potential of the approach for the fractionation of magnetic ultrafine particles on the basis of different retention times in the through-flow of magnetic separation columns (see FIG. 4).

Figure 4:
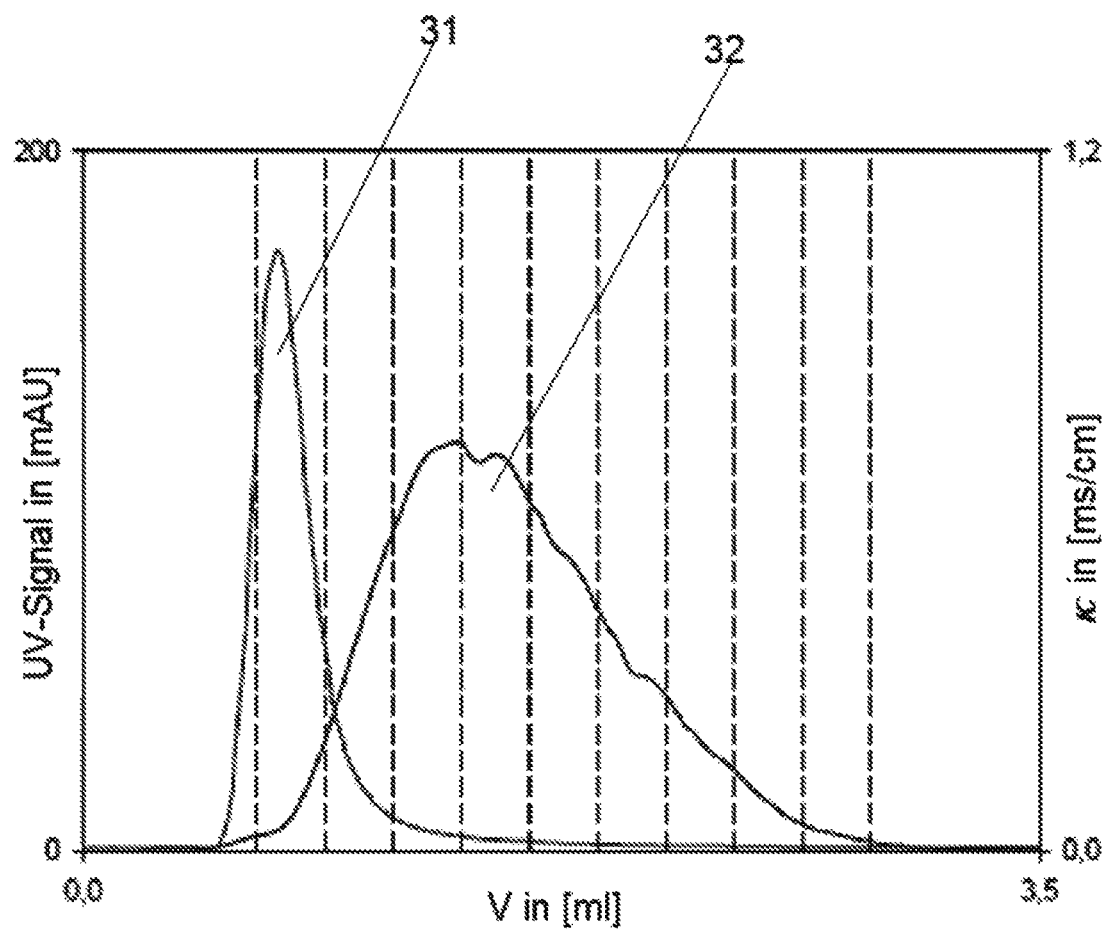
FIG. 4 shows a representation of the increase in the retention time of magnetic ultrafine particles in a separating column exposed to a magnetic field by comparison of the retention times of tracer ions added with the sample and the ultrafine particles in the size range 50-200 nm.

FIG. 4 shows, in a diagram, an illustration of the increase of the retention time of magnetic ultrafine particles in a separation column with superimposed magnetic field (proportional to the illustrated retention volume V in [mL]) via a comparison of the retention times (retention volumes) of tracer ions 31 introduced with the sample and of the ultrafine particles 32 in the size range from 50-200 nm. The curves for the ultrafine particles are visually plotted in the UV light signal in [mAU], and those for the tracer ions introduced with the sample are visually plotted in the conductivity signal κ in [mS/cm] versus the retention volume V in [mL].

The present invention is not limited to embodiments described herein; reference should be had to the appended claims.

LIST OF REFERENCE NUMERALS

1 Connecting lines
2 Through-flow direction
3 Separating column
4 Magnetic field source
5 Infeed
6 Inlet for a suspension of ultrafine particles to be separated
7 Inlet for at least one additional mobile phase
8 Discharge
9 Outlet for a first discharge suspension
10 Outlet for a second discharge suspension
11 Manifold pipe for the suspension of ultrafine particles to be separated
12 Manifold pipe for the additional mobile phase
13 Collector pipe for the first discharge suspension
14 Collector pipe for the second discharge suspension
15 Shutoff valve for the inlet 6
16 Shutoff valve for the inlet 7
17 Shutoff valve for the inlet 9
18 Shutoff valve for the inlet 10
19 Delivery pump for manifold pipe 11
20 Delivery pump for manifold pipe 12
21 Prefilter for manifold pipe 11
22 Prefilter for manifold pipe 12
23 Outlet for the second discharge suspension switched to the through-flow switching position
24 Inlet for the suspension of ultrafine particles to be separated switched to the through-flow switching position
25 Outlet for the first discharge suspension switched to the through-flow switching position
26 Inlet for the additional mobile phase switched to the through-flow switching position
27 Additional connecting line
28 Delivery pump for fluid circuit in through-flow direction 2
29 Police filter
30 Shutoff valve
31 Retention times for tracer ions added with the sample
32 Retention times for the ultrafine particles

What is claimed is:

1. An apparatus for a selective fractionation of ultrafine particles, the apparatus comprising:

at least three separating columns each of which comprise an inlet port, an outlet port, and a packing, the at least three separating columns being fluidically connected in series by connecting lines, where one respective connecting line connects the outlet port of a separating column to the inlet port of a separating column which is arranged downstream in a predetermined through-flow direction, the at least three separating columns each being configured to be through-flowable in the predetermined through-flow direction;

at least one infeed which is arranged to feed into each connecting line, the at least one infeed being arranged upstream of each of the at least three separating columns, each of the at least one infeed comprising an inlet for a suspension of ultrafine particles to be separated and an inlet for at least one additional mobile phase which inlets are configured to be alternately operated;

at least one discharge branching off from each connecting line, the at least one discharge being arranged downstream of each of the at least three separating columns, each of the at least one discharge comprising an outlet for a first discharge suspension of the ultrafine particles and an outlet for a second discharge suspension of the ultrafine particles which outlets are configured to be alternately operated, wherein the ultrafine particles of the first discharge suspension interact more strongly with the packing of each of the at least three separating columns than the ultrafine particles of the second discharge suspension;

a shutoff valve which can be positioned to have a blocking switching position and a through-flow switching position arranged at each of the inlets and at each of the outlets; and a control means for a simultaneous switching of the through-flow switching position of the shutoff valves at the inlets and at the outlets, wherein at least one inlet and at least one outlet is respectively switchable to the through-flow switching position for the suspension of ultrafine particles to be separated, for the least at least one additional mobile phase, for the first discharge suspension of ultrafine particles, and for the second discharge suspension of ultrafine particles, wherein, at least one of the at least three separating columns is arranged between the outlet switched to the through-flow switching position for the second discharge suspension of ultrafine particles and the inlet upstream therefrom switched to the through-flow switching position for the suspension of ultrafine particles to be separated, at least one of the at least three separating columns is arranged between the outlet switched to the through-flow switching position for the first discharge suspension of ultrafine particles and the inlet downstream therefrom switched to the through-flow switching position for the suspension of ultrafine particles to be separated, at least one of the at least three separating columns is arranged between the outlet switched to the through-flow switching position for the first discharge suspension of ultrafine particles and the inlet upstream therefrom which is switched to the through-flow switching position for the at least one additional mobile phase, and at least one magnetic field source for a magnetic field is arranged in each of the at least three separating columns.

2. The apparatus as recited in claim 1, wherein each of the at least three separating columns further comprises a through-flowable matrix.

3. The apparatus as recited in claim 2, wherein the through-flowable matrix is a through-flowable fixed bed of non-porous packing elements or wires comprising a magnetizable material.

4. The apparatus as recited in claim 3, wherein the non-porous packing elements have a saturation magnetization greater than or equal to 1 $A \cdot m^2/kg$.

5. The apparatus as recited in claim 3, wherein at least one of, the non-porous packing elements in each of the at least three separating columns, and the at least three separating columns, are identical.

6. The apparatus as recited in claim 3, wherein each of the at least three separating columns comprises one of the at least one magnetic field source.

7. The apparatus as recited in claim 3, wherein the at least one magnetic field source comprises at least one permanent magnet.

8. The apparatus as recited in claim 3, wherein the at least one magnetic field source comprises at least one electromagnetic coil.

9. The apparatus as recited in claim 3, wherein the at least one magnetic field source comprises the non-porous packing elements comprising the magnetizable material as permanent magnetic packing elements.

10. The apparatus as recited in claim 9, wherein a magnetic field strength of each magnetic field is controllable and variable via the control means.

11. The apparatus as recited in claim 10, wherein each magnetic field strength has a cyclical progression.

12. The apparatus as recited in claim 1, wherein the at least three separating columns are fluidically connected in series via the connecting lines and are connected as a ring to form a circuit.

13. A method for a selective fractionation of ultrafine particles, the method comprising:

providing the apparatus as recited in claim 1;

providing a liquid mobile phase;

providing a suspension of ultrafine particles to be separated;

passing the liquid mobile phase serially through the at least three separating columns in the predetermined through-flow direction;

activating magnetic fields in at least one of the at least three separating columns;

introducing the suspension of ultrafine particles to be separated into the connecting line between two of the at least three separating columns via the inlet; and performing a simultaneous cyclic switching of the through-flow switching positions of the shutoff valves at the inlets and at the outlets, wherein, at least one inlet for the suspension of ultrafine particles and for the liquid mobile phase, respectively, and at least one outlet for the first discharge suspension of ultrafine particles and for the second discharge suspension of ultrafine particles, respectively, is simultaneously switchable to the through-flow switching position, wherein the ultrafine particles of the first discharge suspension interact more strongly with the packing than the ultrafine particles of the second discharge suspension, at least one of the at least three separating columns is arranged between the outlet switched to the through-flow switching position for the second discharge suspension of ultrafine particles and the inlet upstream therefrom switched to the through-flow switching position for the suspension of ultrafine particles to be separated, at least one of the at least three separating columns is arranged between the outlet switched to the through-flow switching position for the first discharge suspension of ultrafine particles and the inlet downstream therefrom which is switched to the through-flow switching position for the suspension of ultrafine particles to be separated, and at least one of the at least three separating columns is arranged between the outlet switched to the through-flow switching position for the first discharge suspension of ultrafine particles and the inlet upstream therefrom switched to the through-flow switching position for the liquid mobile phase.

14. The method as recited in claim 13, wherein a magnetic field strength of each magnetic field is controllable and variable via the control means.

15. The method as recited in claim 13, wherein the suspension of ultrafine particles to be separated comprises dia- or paramagnetic ultrafine particles and comprises a solution which is more strongly paramagnetic than the ultrafine particles or a ferrofluid as a liquid.

16. The method as recited in claim 13, wherein the suspension of ultrafine particles to be separated comprises ferro-, ferri- or paramagnetic ultrafine particles and a solution which is more weakly paramagnetic or diamagnetic than the ultrafine particles as a liquid.

17. The method as recited in claim 13, wherein the ultrafine particles comprise a particle size of 1-20 μm.

18. The method as recited in claim 17, wherein the particle size is 5-10 μm.

* * * * *